No. 750,176. PATENTED JAN. 19, 1904.
J. W. FAESSLER.
FLUE EXPANDER.
APPLICATION FILED NOV. 6, 1903.
NO MODEL.
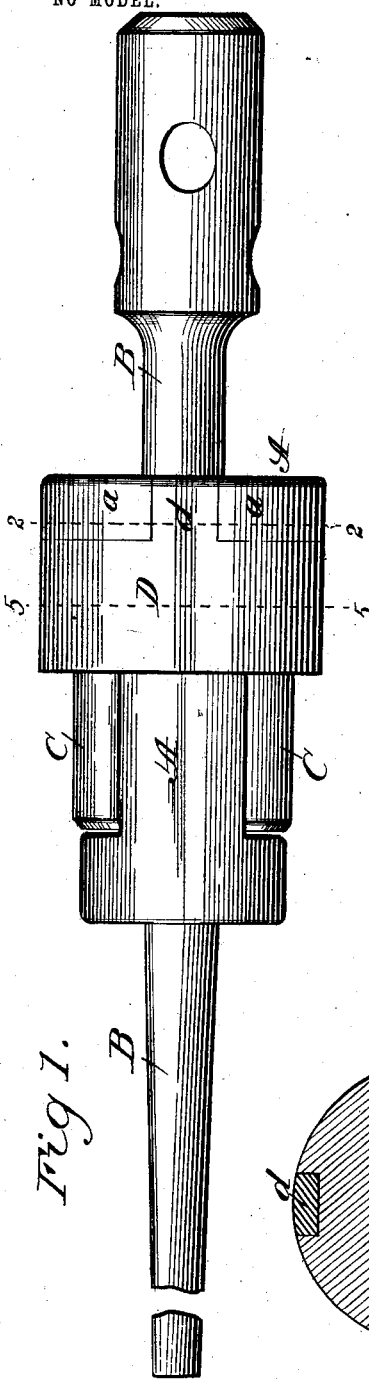
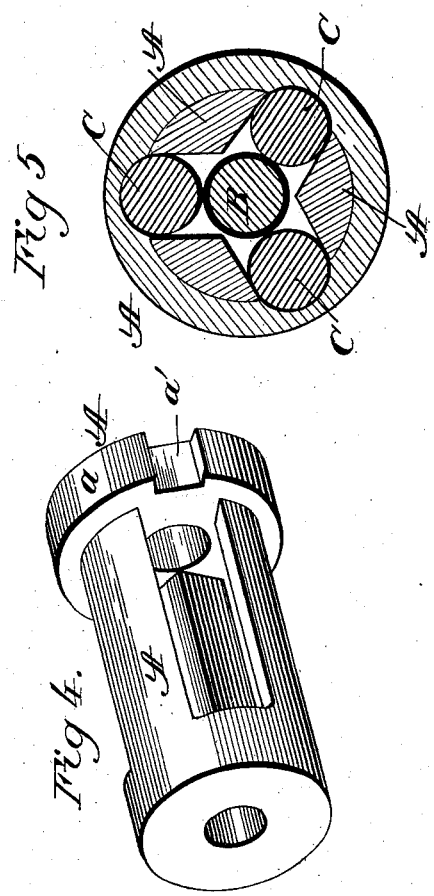
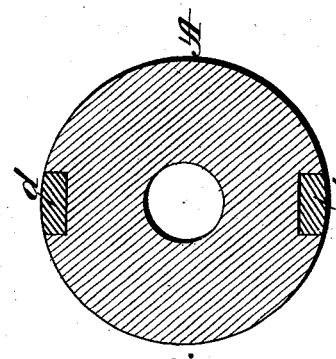
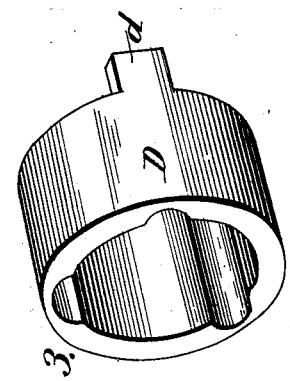
WITNESSES:
Phil E. Barnes.
Amos W. Hart.
INVENTOR
John W. Faessler.
BY Munn & Co.
ATTORNEYS No. 750,176. Patented January 19, 1904.

UNITED STATES PATENT OFFICE.

JOHN WILLIAM FAESSLER, OF MOBERLY, MISSOURI.

FLUE-EXPANDER.

SPECIFICATION forming part of Letters Patent No. 750,176, dated January 19, 1904.

Application filed November 6, 1903. Serial No. 180,056. (No model.)

*To all whom it may concern:*

Be it known that I, JOHN WILLIAM FAESSLER, a citizen of the United States, and a resident of Moberly, in the county of Randolph and State of Missouri, have invented an Improved Flue-Expander, of which the following is a specification.

My invention is an improvement in flue-expanders of the roller type—that is to say, in expanders whose body is provided with a longitudinal bore to receive an expanding-mandrel and with antifriction-rollers working in contact with said mandrel and adapted to move laterally in longitudinal slots.

In the construction of tubular boilers the ends of the fire-flues that project from the flue-sheet are sometimes cut so as to have an unequal length, so that some project too far to permit them to be successfully rolled and expanded by a tool of the type indicated or any other of the general class. In order to adapt such tools for use with flues of unequal length, I have provided the roller-box or cylindrical body of the tool with a removable collar, so that it may be replaced by another of greater or less width as conditions require.

The details of construction, arrangement, and combination of parts are as hereinafter described, reference being had to accompanying drawings, in which—

Figure 1 is a side or plan view of my improved flue-expander. Fig. 2 is a cross-section on the line 2 2 of Fig. 1. Fig. 3 is a perspective view of the removable collar. Fig. 4 is a perspective view of the roller-box or slotted cylindrical body of the tool. Fig. 5 is a cross-section on the line 5 5 of Fig. 1.

Referring in the first instance to Fig. 1, A indicates the roller-box or cylindrical body of the tool, B the tapered mandrel, and C the series of cylindrical rollers, which, as shown in Fig. 5, are held in longitudinal slots formed in the roller-box A and also project into recesses formed interiorly in the removable collar D. The roller-box A in expanders of this type is generally provided with a thick circumferential collar or enlargement $a$. Such collar being fixed with relation to the body of the roller-box does not permit the latter to be successfully used in flues whose ends may be cut to an unusual length. I have therefore devised for tools of this class the removable collar D, or rather a series of such collars, which are in practice made of unequal thickness. As shown in Fig. 1, such collar D is passed over the cylindrical body of the roller-box A, which it fits snugly, and is forced back until it abuts the thick collar or shoulder $a$. In order to suitably connect it with the latter and prevent its rotation on the body of the roller-box when the tool is in use, I provide it with lugs $d$, which project from its rear edge and enter corresponding notches $a'$ in the fixed shoulder $a$. (See Figs. 2 and 4.) While the collar D is thus held firmly in due position for effective use of the tool in expanding a flue, it may be readily removed in an obvious manner. Hence if a flue be cut off, say, one inch too long, and the collar B with which the body of the tool is provided is too wide to permit successful use of the tool, such collar may be removed and replaced by another of less width. Thus the tool may be adapted for successful use in flues whose ends project to a greater or less distance from the flue-sheet, and for this purpose two or more collars of different widths will be provided for each roller-box. The collar D being in one solid or integral piece and fitting snugly on the box A practically strengthens or reinforces the latter, so that undue expansion of the sides of the roller-slots is prevented which is liable to occur by reason of the rollers pressing outward in consequence of the heavy strain to which the tools are subjected. The feature of detachability of the collar D is of further advantage in case the collar becomes worn, since it may be easily replaced by a duplicate, thereby economically increasing the life of the tool.

Having thus described my invention, what I claim as new, and desire to secure by Letters Patent, is—

1. A flue-expander comprising a roller-box having a circumferential shoulder provided with notches and a removable collar fitted to the body of the box and having lugs adapted to fit in the said notches, substantially as described.

2. In a flue-expander of the type indicated, the combination, with the roller-box having a radial shoulder, of the removable collar having projections that enter corresponding sockets in the shoulder as and for the purpose specified.

JOHN WILLIAM FAESSLER.

Witnesses:
E. F. GUTEKUNST,
W. T. SMART.